Patented Oct. 27, 1925.

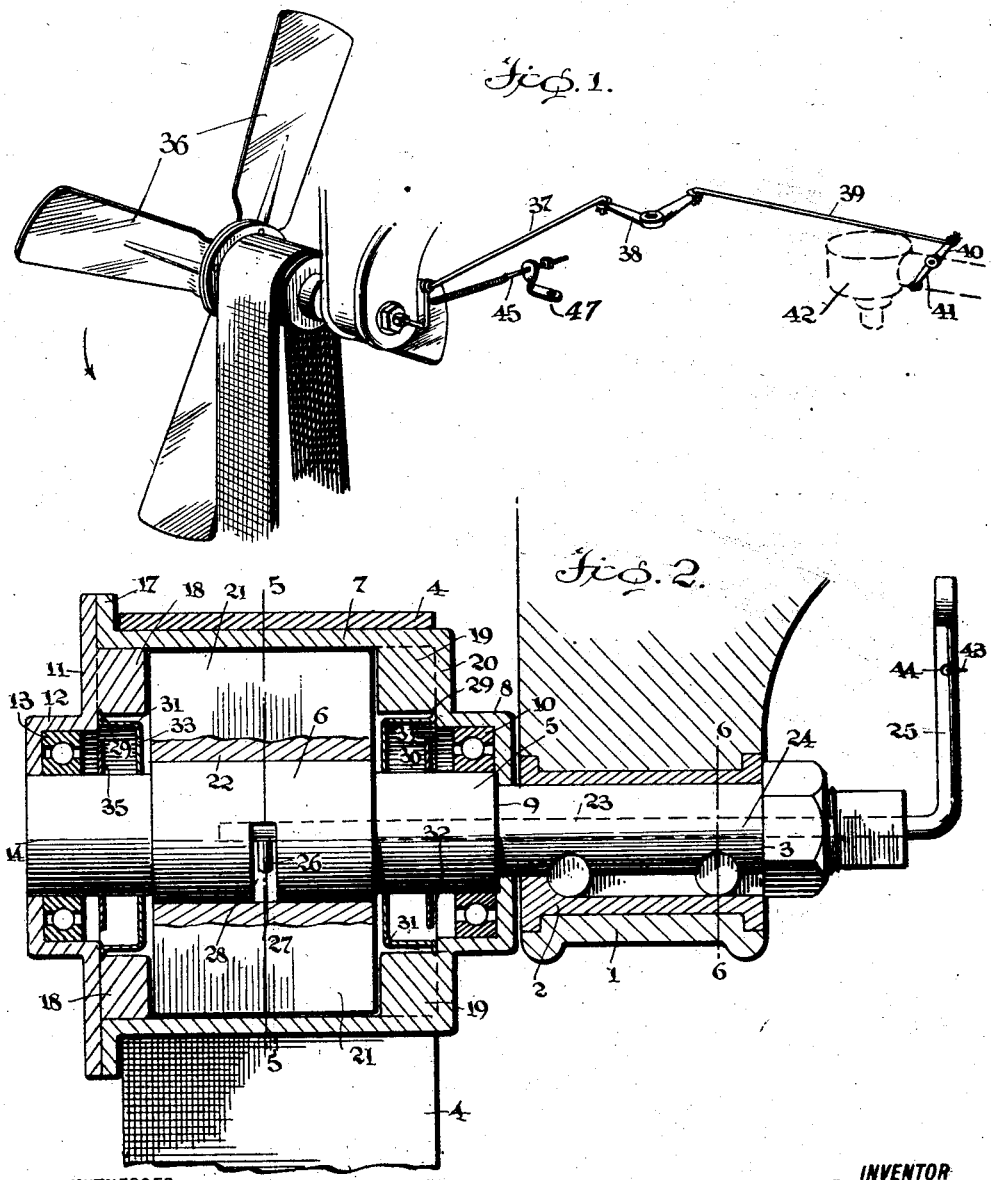

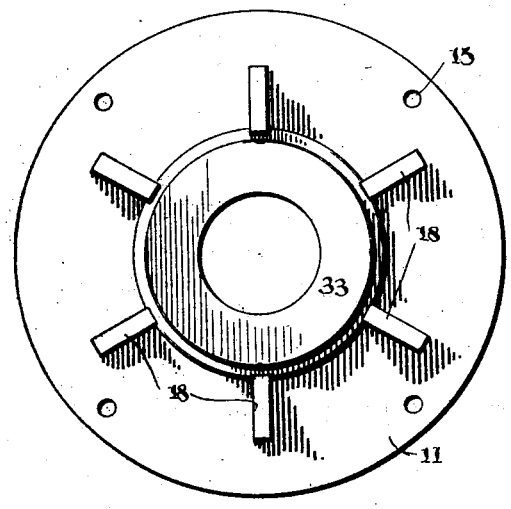
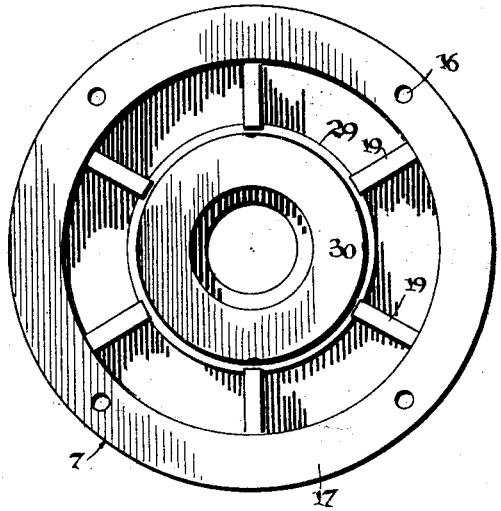
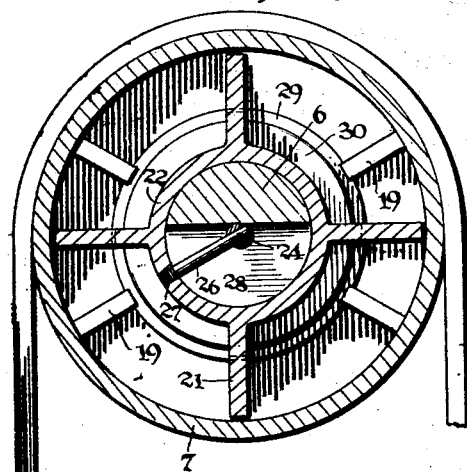
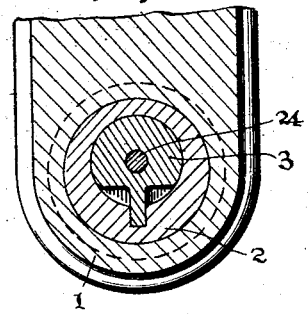

1,559,125

UNITED STATES PATENT OFFICE.

ORR TILTON NICHOL, OF ST. EDWARDS, NEBRASKA.

GOVERNOR.

Application filed April 13, 1923. Serial No. 631,953.

*To all whom it may concern:*

Be it known that I, ORR TILTON NICHOL, a citizen of the United States, and a resident of St. Edwards, in the county of Boone and State of Nebraska, have invented certain new and useful Improvements in Governors, of which the following is a specification.

This invention relates to governors for power plants and is more particularly directed to a governor adapted to control the speed of the engine of a tractor.

An object of the invention is the provision of a governor forming with the usual fan of an automobile engine, a unitary structure.

Another object of the invention is the provision of a device comprising a fan and fan belt pulley with mechanism within the pulley and connected with the butterfly valve of a carbureter for controlling said valve according to the speed of the engine.

Another object of the invention is the provision of a governing device including within the pulley directly connected with the cooling fan of an automobile engine with fluid operated mechanism within the pulley directly connected with the butterfly valve of the carbureter whereby the speed of the engine is controlled in accordance with the requirements of the engine.

Other objects and advantages will become apparent during the course of the following description.

The invention is illustrated by way of example in the accompanying drawings, in which, Figure 1 is a view in perspective of a fan and belt pulley of a tractor and the operative connections between the butterfly valve of a carbureter and a governor enclosed within the fan pulley.

Figure 2 is a longitudinal vertical section of the governing mechanism included in the fan pulley.

Figure 3 is a plan view of the closure for the fan pulley.

Figure 4 is a plan view of the fan pulley per se.

Figure 5 is a sectional view taken along the line 5—5 of Figure 2.

Figure 6 is a transverse vertical section taken along the line 6—6 of Figure 2.

Figure 7 is a view in perspective of the adjustable spring means for regulating the operation of the governor.

Referring to the drawings, 1 represents a sleeve at the end of a bracket. The bracket is attached to a fixed part of a tractor. An eccentric mounting 2 is located in the sleeve 1 for adjusting the fan shaft 3 towards or away from the lower pulley which drives the belt 4. The sleeve 1 and eccentric mounting 2 from the ordinary parts which are usual in the well-known Ford tractor.

The shaft 3 is provided with stepped enlargements 5 and 6 upon which is rotatably mounted the cup-shaped pulley 7. The pulley is provided with a boss 8 having its inner wall in engagement with a shoulder 9 at one end of the enlargement 5 on the shaft 3.

A roller bearing 10 is seated in the boss 8 and mounted on the enlargement 5 of the shaft. A closure 11 is provided with a boss 12 in which is seated a roller bearing 13 and mounted on the outer reduced end 14 of the shaft. The closure 11 is provided with perforations 15 alining with perforations 16 in the flange 17 of the pulley 7 through which are inserted bolts for rigidly connecting the closure 11 to the outer open flanged end of the pulley 7.

Upon the inner face of the closure 11 are formed drag vanes 18 which project into the pulley 7 while drag vanes 19 are formed integrally with the rear or bottom wall 20 of the pulley 7 and have an integral connection with the inner cylindrical wall of said pulley. The drag vanes 18 and 19 are radially arranged with respect to the axis of the pulley 7 with a vane 18 in alinement with a vane 19 and spaced from each other with their inner facing edges closely associated with the side edges of blades 21 formed integrally with a sleeve 22 mounted for slight rotation on the enlargement 6 of the shaft.

The shaft 3 is provided with a bore 23 extending longitudinally and centrally through the shaft to a point in the enlargement 6 which is slightly beyond the longitudinal center of the enlargement. A rod 24 is rotatably mounted in the bore and extends outwardly and terminates in an upstanding arm 25. The inner end of the rod 24, which is located in the enlargement 6 of the shaft, is provided with a perforation in which is adapted to be inserted one end of a pin 26. The other end of the pin is provided with threads at 27 adapted to be screwed into a threaded perforation in the sleeve 22. The enlargement 6, adjacent the alined perforations in the sleeve 22 and the rod 24, is provided with a segmental slot 28 through which the pin 26 extends and in which said pin is adapted to be oscillated.

The hollow pulley 7 is adapted to be partially filled with oil or some other fluid and I propose to fill the pulley at least half full.

Each of the vanes 19 are provided with notches where their side edges join the rear wall 20 of the pulley 7 which are adapted to receive a flange 29 of a cup-shaped member 30. The flange is sprung into these notches whereby the cup is maintained in position adjacent the bearing 10. The member 30 is provided with a central perforation, the peripheral edge of which embraces the enlargement 5 of the shaft. The object of the member 30 is to prevent excess fluid from passing into the bearing 10 and beyond the shaft 3 where the boss 8 engages the shaft. Perforations 31 are formed in the member 30 to permit a certain amount of oil to pass to the bearing. A steel washer 32 is forced on the portion 5 of the shaft between the bearing 10 and the cup-shaped member 30.

The vanes 18 are provided with notches similar to the notches of the vanes 19 and adapted to be engaged by the flange 29 of the cup-shaped member 33. This cup-shaped member is provided with perforations 31 adapted to function in the same manner as the perforations in the cup-shaped member 30. A steel washer 35 is also forced on the end 14 of the shaft and located between the bearing 13 and the cup-shaped member 33.

Fan blades 36 have their inner ends rigidly secured to the closure 11 and are adapted to be rotated with the pulley 7 and likewise with the closure.

The arm 25, which is integrally formed with the rod 24, is connected at its upper end by a link 37 which in turn connects said arm with one end of a bell crank lever 38. The other end of the bell crank lever is connected by a link 39 to a crank 40 on the end of a shaft 41 which operates the butterfly valve of a carbureter 42.

A spring 43 has one end connected to a perforation 44 in the arm 25 and its other end connected to a threaded rod 45. The threaded end of the rod is engaged by a nut 46. The nut engages a bracket 47 mounted on a fixed part of the engine tractor for drawing the rod up for increasing tension on the spring 43.

The operation of my device is as follows:

The fan belt 4 provides a direct drive between the crank shaft of the engine and the pulley 7 so that when the crank shaft is rotated the pulley 7 will be simultaneously rotated thereby revolving the fan blades 36 in the direction indicated by the arrow in Figure 1. The rotation of the pulley and the drag vanes 18 and 19 causes an agitation of the liquid in the pulley forcing the liquid past the blades 21 formed on the sleeve 22. This tends to pull the blades 21 along simultaneously with the drag vanes 18 and 19 thereby slightly oscillating said vanes in the direction of movement of the drag vanes. The spring connected to arm 25 and bracket 47 tends to resist this movement and retard the rotation of the vanes 21. As the vanes 21 and the integrally formed sleeve are rotated, the pin 26 will likewise be moved accordingly in the substantially semi-circular slot 28 in the enlargement 6 of the shaft 3. Since the pin 26 is connected with the rod 24 the rod will likewise be rotated, oscillating the arm 25, shifting the links 37 and 39 through the bell crank lever 38 and tending to close the throttle valves on the shaft 41, thereby limiting the amount of fuel supplied to the engine.

Since the segmental slot 28 is substantially 180° the pin 26 will be limited to that extent of rotation.

The greater the speed of the pulley 7, the greater the tendency of the fluid in the pulley to move the vanes 21 and thereby exert a greater closing action on the throttle valve of the carbureter. The slowing down of the speed of the engine will cause a proportionate retrograde movement of the vanes 21 with respect to the drag vanes 18 and 19 and thereby open the throttle valve of the carbureter further to admit a greater quantity of gas.

The adjustment of the nut 46 against the bracket 47 either increases or decreases the tension on the spring 43 thereby varying the action of the governor in controlling the opening or closing of the throttle valve of the carbureter.

What I claim is:

1. A governor for tractors comprising in combination, a cup-shaped pulley, a closure for the open end of the pulley and provided with a centrally disposed bearing, fan blades radially secured to the closure, radially disposed drag vanes on the closure and projecting into the pulley, radially disposed drag vanes on the inner wall of the pulley and alining with the first mentioned vanes, a centrally disposed boss projecting outwardly from the pulley, a roller bearing seated within the boss, a shaft mounted on the bearings and having an annular enlargement in the pulley, a sleeve mounted on the enlargement and provided with radiating blades movable between the alined drag vanes, said shaft being provided with an axial bore and a slot cut through the periphery of the enlargement and opening into the bore, said sleeve being provided with a threaded perforation adjacent the slot in the enlargement, a rod located in the bore provided with a perforation in radial alinement with the threaded perforation in the sleeve, a pin having a threaded engagement with the threaded perforation of the sleeve and projecting into the perforation in the rod, and means operatively connecting the rod with the butterfly valve of a carbureter, said pulley being adapted to be partially filled with a fluid, and means adjacent the bearings in the closure and the pulley to prevent loss of the fluid from the pulley.

2. A governor for tractors comprising in combination, a hollow pulley, fan blades radially connected with the pulley, drag vanes radially disposed within the pulley, a shaft upon which said pulley is mounted for rotation, a sleeve provided with blades mounted on the shaft, with the blades adapted for slight rotation between the drag vanes, said shaft being provided with a longitudinal bore, a rod loosely mounted within the bore, a pin connecting the sleeve with the rod, said shaft being provided with a slot in which the pin is adapted to oscillate, said pulley being adapted to be partially filled with fluid.

3. A governor for tractors comprising in combination, a hollow shaft provided with a transverse slot, a hollow pulley mounted for rotation on the shaft, fan blades mounted radially on the pulley, radially disposed drag vanes connected with the inner wall of the pulley, a sleeve mounted for rotation on the shaft within the pulley, radial blades connected to the sleeve and movable between the drag vanes, a rod mounted for simultaneous rotation with the sleeve and located in the hollow shaft, a pin connecting the sleeve with said rod and extending through the transverse slot of the shaft, said pulley being adapted to be partially filled with fluid.

4. A governor for tractors comprising a hollow shaft provided with a slot, a hollow pulley mounted for rotation on said shaft, said pulley being partially filled with a fluid, means on the shaft adapted to have slight rotation when the pulley is rotated, means within the pulley closely associated with the first mentioned means and cooperating with the fluid to cause slight rotation of said first mentioned means when the pulley is rotated, a rod rotatable in the hollow shaft, and means projecting through the slot in the shaft and connecting the rod with the first mentioned means.

5. A governor for tractors comprising in combination, a hollow shaft provided with a transverse slot, a hollow pulley mounted for rotation on the shaft, fan blades mounted radially on the pulley, radially disposed drag vanes connected with the inner wall of the pulley, a sleeve mounted for rotation on the shaft within the pulley, radial blades connected to the sleeve and movable between the drag vanes, a rod mounted for simultaneous rotation with the sleeve, a pin connecting the sleeve with said rod and extending through the transverse slot of the shaft, said pulley being adapted to be partially filled with fluid, and means embracing the shaft and the opposite ends of the pulley to prevent loss of fluid from said pulley.

6. In a governor for tractors in combination, a shaft, a hollow pulley having an open end, a closure for said end, hubs centrally located on the closure and on the opposite end of the pulley, said pulley being partially filled with oil, roller bearings mounted in the hubs, vanes on the closure projecting into the pulley, and vanes on the inner wall of the pulley, cup-shaped members provided with peripheral flanges engaged by the vanes on the closure and the vanes on the inner wall of the pulley and forming sealed chambers with the hubs for housing the bearings to prevent loss of oil past the bearings.

7. A governor for tractors comprising in combination, a shaft, a hollow pulley mounted for rotation on said shaft and having one end closed, a closure for the open end provided with radially disposed fan blades, said closure and closed end of the pulley being provided with bearings for the shaft, blades mounted on the shaft and adapted to have a slight rotation relative to the shaft when the pulley is rotated, said pulley being partially filled with oil, means on the closure and means in the pulley cooperating with the oil to cause a slight rotation of the blades when the pulley is rotated, a rod operatively connected with the blades mounted on the shaft whereby the rod is rotated with said blades.

ORR TILTON NICHOL.